A. GERMANN AND E. LANG.
MUD GUARD FOR WHEELS OF VEHICLES.
APPLICATION FILED JAN. 19, 1921.
1,415,436.
Patented May 9, 1922.
2 SHEETS—SHEET 1.
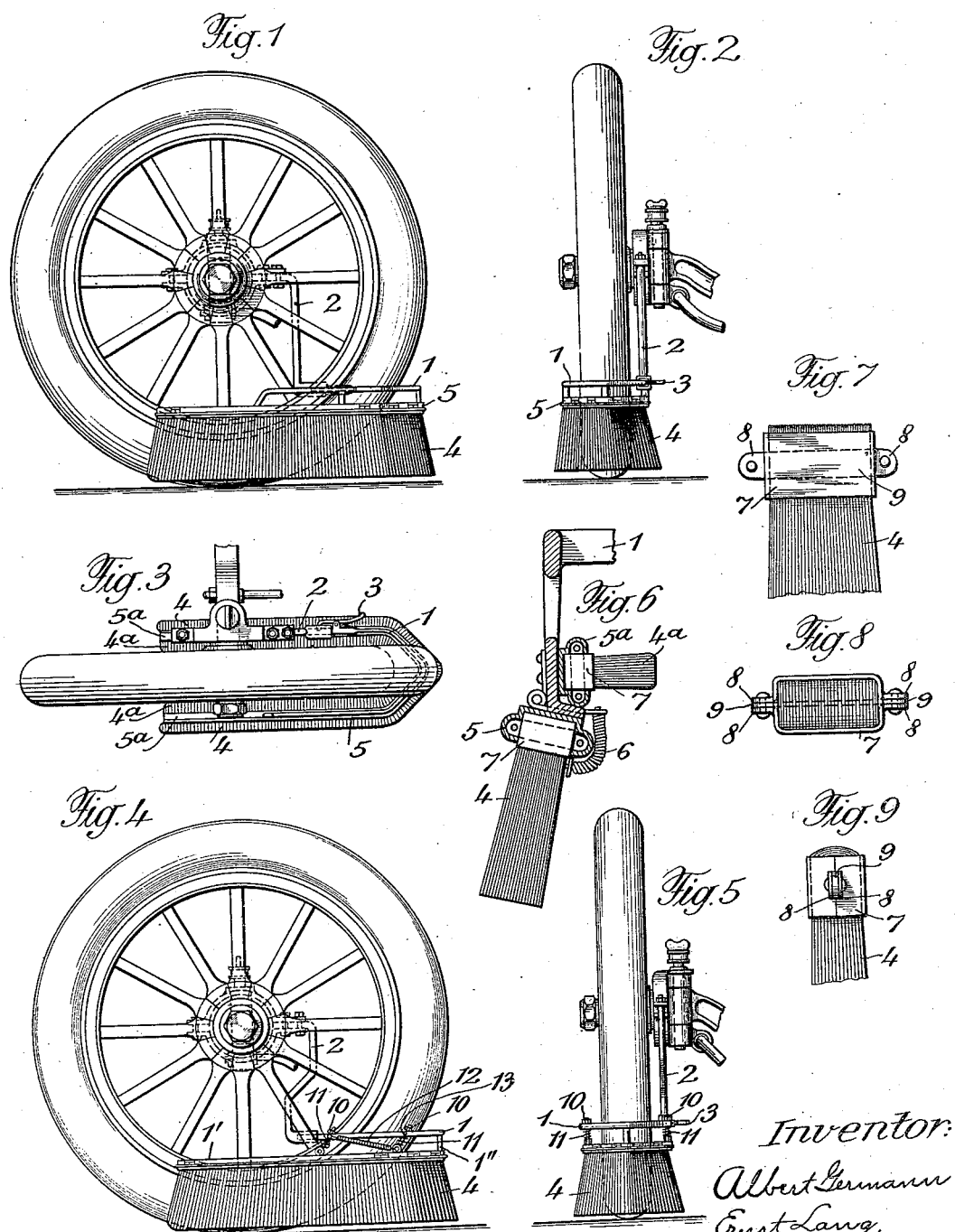

A. GERMANN AND E. LANG.
MUD GUARD FOR WHEELS OF VEHICLES.
APPLICATION FILED JAN. 19, 1921.
1,415,436.
Patented May 9, 1922.
2 SHEETS—SHEET 2.
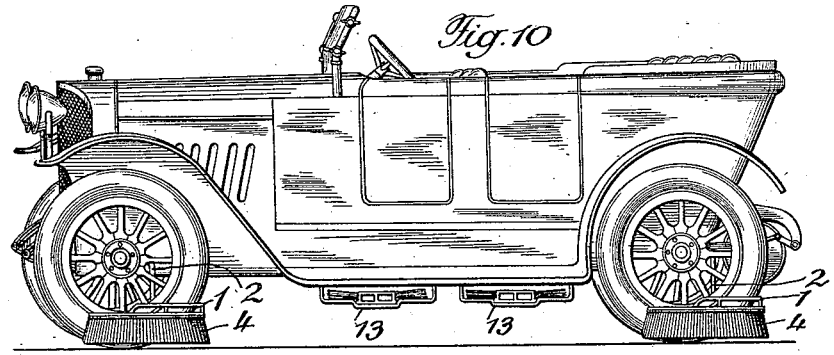
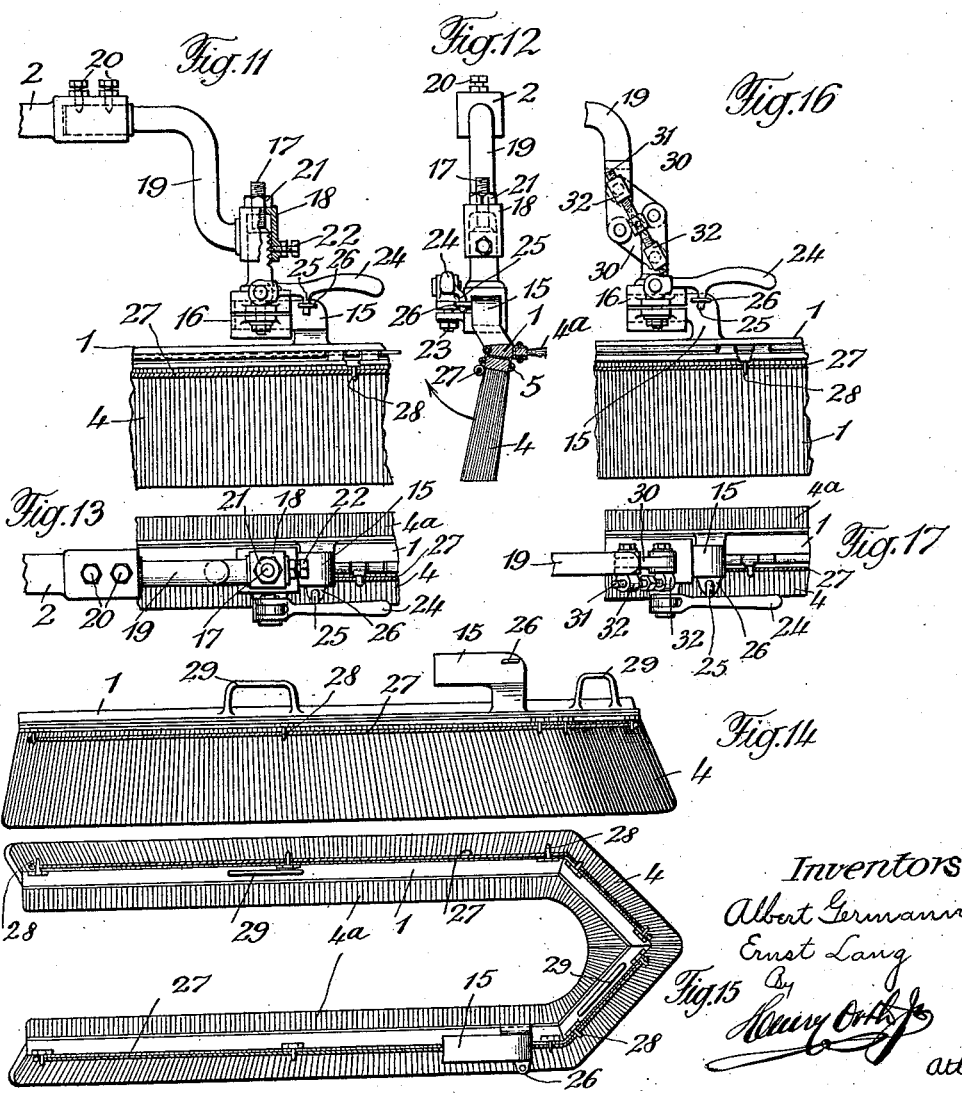

UNITED STATES PATENT OFFICE.

ALBERT GERMANN AND ERNST LANG, OF ST. GALLEN, SWITZERLAND.

MUD GUARD FOR WHEELS OF VEHICLES.

1,415,436.  Specification of Letters Patent.  Patented May 9, 1922.

Application filed January 19, 1921. Serial No. 438,397.

*To all whom it may concern:*

Be it known that we, ALBERT GERMANN and ERNST LANG, citizens of the Republic of Switzerland, residing at St. Gallen, Switzerland, have invented certain new and useful Improvements in Mud Guards for Wheels of Vehicles; and we do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

The invention relates to improvements in mudguards for wheels of vehicles such as automobiles, motor-cycles and the like.

The known mudguards for wheels of vehicles provided with one side wall at the outer side of the wheel present the disadvantage that the mud is thrown from the inner side of the vehicle to the opposite side of the latter. Furthermore mudguards with more or less rigid guard walls cannot be so arranged as to occupy the smallest possible space defined by their construction without, for instance, disconnecting some of their parts, which may be necessary when packing the mudguards for despatch or when stowing the guards away when they are not used. This difficulty increases considerably if the wall of the mudguard extends to more than one side of the wheel.

The object of the present invention is a mudguard for wheels of vehicles such as automobiles, motorcycles and the like, which is characterized by the feature that the wheel is covered at its outer side, at its inner side and at the back by means of a protecting wall, or member, which is supported by a frame detachably fixed to the vehicle and which wall may be folded against the frame. Thus the possibility exists to bring the protecting wall and the frame into one horizontal plane whereby the space required by the detached frame and the protecting wall is limited to a minimum. As the protecting wall does not need to be disconnected from the frame the mudguard can be fixed in the operative position in a very short time.

The accompanying drawings illustrate by way of example several modes of carrying out the invention. In this drawing:

Fig. 1 is a side view of a front wheel of an automobile provided with a mudguard according to one constructional example, Fig. 2 shows in an end view the wheel and the guard seen from the rear wheel, Fig. 3 is a plan view of Fig. 1, Fig. 4 illustrates a side view of a front wheel of an automobile fitted with a mudguard according to a second constructional example, Fig. 5 is an end view of the wheel and guard shown in Fig. 4 and seen from the rear wheel, Fig. 6 is a vertical section on a larger scale through the guard shown in Fig. 1, Figs. 7, 8 and 9 illustrate on a larger scale a detail in a side view, plan view and end view, Fig. 10 is a side view of an automobile fitted with mudguards according to the invention; this illustration shows at the same time the manner of stowing the mudguards away below the foot board when not used.

Fig. 11 illustrates in a side view a third constructional example,

Fig. 12 is an end view and

Fig. 13 a plan view of the third example,

Figs. 14 and 15 show in side view and plan view the guard wall for the third exemplification, Fig. 16 is a side view of a fourth constructional example and Fig. 17 is a plan view of Fig. 16.

With all the constructional examples illustrated 1 denotes the frame which extends to three sides of the wheel of the automobile, i. e. to its inner side, its rear side and its outer side. The frame 1 is placed over a supporting part 2 and held to the latter by means of a securing lever 3 provided on the frame, which lever may be lifted against the action of a spring to make the frame 1 free so that the latter may be detached from the supporting part 2. The supporting part 2 is rigidly fixed to the axle of the automobile. The frame 1 shown in Figs. 1, 2 and 3 forms a rigid structure, whereas in the constructional example illustrated in Figs. 4 and 5 the lower part 1' of the frame together with the guard member is movably arranged relatively to the upper part of the frame. In this arrangement two bolts 10 are provided in each of the longitudinal sides of the frame, which bolts are linked to the lower part 1' of the frame and coact at their other ends with pivot pieces 13 fixed to the upper part of the frame. A compression spring 11 is placed over each bolt 10. 12 denotes a tension spring provided at each of the two longitudinal sides of the frame and 1″ denotes a bolt serving to act as a stop for the part 1′ of the frame in its movement in one of the longitudinal directions. The last described constructional example is specially adapted for vehicles with a weak, soft springing action.

The guard member fitted to frame 1 is formed in all the examples illustrated by means of a brush 4 which extends to the three sides of the frame. This brush may also be replaced for example by a wire netting covered with cloth, or by parts made of rubber or of some insulating material. To hold the brush 4 a supporting bar 5 of channelled cross section is hinged to frame 1, which bar abuts against an oblique facing provided on the frame (Fig. 6) and which is pressed by means of springs 6 against the frame. The supporting rod 5 is subdivided in the longitudinal direction into four parts, one of which parts corresponds to the length of the outer side of the frame, a second part corresponds to the length of the inner side and the remaining two parts to the rear side of the frame. Every part of the supporting bar and therefore every part of the brush connected therewith may be independently turned in an upward direction towards the frame (as is shown in chain-dotted lines in Fig. 6). The brush itself is composed of single elements, one of which is illustrated in Figs. 7–9. As may be seen from these illustrations every brush element is provided with a band or clip 7 which may be made of aluminium, zinc plate or sheet brass. The clip is formed by two equal halves provided with lugs 8 and riveted together at these lugs. The inner part of the clip is divided into two parts by means of a member 9 and the bristles clamped in the clip are placed midway their length over said member 9 so that two brush parts are formed. The single brush elements are held by means of their lugs in the supporting channels 5 which are widened to take up said lugs. The frame 1 is provided with a second bar of channelled section 5$^a$ which supports a horizontally arranged brush 4$^a$ projecting closely towards the tyre of the wheel and extending, similarly to brush 4, along the three sides of the frame and being also composed of single brush elements. By means of the two brushes 4 and 4$^a$, of which the latter might also be arranged in an inclined position, a casing is formed enclosing the wheel on three sides, by which casing the mud thrown up by the wheel is caught (by means of the brush 4) and by which the tyre is kept as clean as possible (by the action of brush 4$^a$). When the frame 1 is detached from the supporting part 2 and the brush 4 is turned up against the action of the springs 5, the brush 4 can be brought into the horizontal plane of the frame in which the brush 4$^a$ is arranged, in which state the whole mudguard, when not being used, requires little space and may, for example, be placed in a cup board 13 provided below the foot board of the automobile (Fig. 10). This cup board may for instance be formed by an iron grating fixed to the foot-board.

In the constructional example illustrated in Fig. 11–15 1 denotes the frame, 2 is the supporting part, 4 and 4$^a$ the guard members or brushes, and 5 is the bar of channel cross section for supporting the brush and hinged to the frame 1. To the frame 1 a bracket 15 is fixed ending in a square part which is inserted into a sleeve 16. The latter forms part of a holding member attached by means of a bolt 17 to a socket 18 of an intermediate part 19. The intermediate part is inserted into a socket provided on the supporting part 2 and detachably fixed to said part by means of bolts 20. The holding member 16, 17 is held in position in the socket 18 by means of a nut 21 and a set screw 22, the latter engaging with notches provided on the bolt 17. Several such notches are provided one above the other whereby an adjustment in height of the holding member and therefore of the brush is made possible. The sleeve 16 into which the bracket 15 is inserted is slit on one side with a bolt 23 and is provided on that side and a lever 24 eccentrically linked to said bolt. In the position illustrated the sleeve 16 is tightened by means of the lever 24, whereby the bracket 15 is secured to said sleeve, a projecting part 25 provided on the lever 24 engages in this position with an eye 26 provided on the bracket 15. The parts 25 and 26 thus prevent a displacement of the frame 1 in the longitudinal direction. By turning the lever 24 the sleeve 16 can be loosened whereupon the bracket 15 may be pulled out of the sleeve. In this manner the frame 1 together with the brushes 4 and 4$^a$ can easily be detached. Along each longitudinal side of the supporting bar 5 a tension spring 27 is provided below the turning axis of said bar, which spring extends along the one half of the rear part of the brush. Both ends of the tension spring 27 are fixed to the supporting bar 5 and are led through eyelets 28. This spring 27 tends to keep the two parts of the brush in an elastic manner in their operative position. When the two parts of the brush connected by said tension spring are turned in an upward direction around the axis of the hinged joints (in the direction of the arrow shown in Fig. 12) the tension spring 27 secures the parts of the brush in their raised position. Handles 29 provided on frame 1 facilitate to carry out said turning operation.

The constructional example illustrated in Figs. 16 and 17 differs from that described above solely in the manner in which the holding member 16, 17 is connected to the intermediate piece 19. The part 17 of the holding member is linked by two links 30 to the bifurcated end of the intermediate piece 19. A tightening bolt 31 diagonally arranged with regard to the four pivot points of the linked connections and cooperating by means of left and right hand thread with the heads 32 of two opposite pivot bolts enables to adjust the height of the frame 1 and of the brush 4 in a very convenient manner.

When the frame 1 is fitted to the frame of the vehicle a simple turning up of the guard member 4 enables to inspect the portion of the tyre normally covered by the guard. The utilization of a brush for forming the guard member has the advantage, that the bristles provide said member with the necessary degree of stiffness and with a certain resiliency which latter feature is favourable when obstacles are met by the lower edge of the brushes. The feature of composing the brushes of single brush elements enables to repair worn out parts of the brush by exchanging the worn out elements. The arrangement of the bristles of the brush elements in metal clips presents the advantage, that these metal clips ensure a good fit in the supporting channel provided on the frame which enables an easy exchange of the brush elements, whereas such an exchange would be rendered difficult if the bristles were held in wooden bodies as the latter are subject to well known alterations of their shape caused by atmospheric influences.

We claim:

1. A mud guard for automobiles and other vehicles, comprising guard members for the sides and back of a wheel and means to permit the individual members to be swung into a horizontal plane and held out of operative position.

2. A mud guard for automobiles and other vehicles, comprising guard members for the sides and rear of the wheel arranged to swing away from the wheel, a spring for yieldingly holding said members in operative position, said spring also holding said members out of operative position when moved substantially to horizontal position.

3. A mud guard for automobiles and other vehicles, comprising depending guard members for each side and the rear of the wheel arranged to swing away from the wheel and auxiliary guard members for the sides and rear of the wheel to prevent mud from splashing above said latter members.

4. A mudguard for wheels of vehicles, having in combination a frame detachably fixed to the vehicle, guard members consisting of separate brushes provided at the inner side, the outer side and the rear of the wheel for retaining the mud thrown up, said brushes being composed of single brush elements, a member hinged to the frame to which member the brush elements are exchangeably secured and a second guard member provided on said frame for cleaning the tyre.

5. A mudguard for wheels of vehicles, having in combination a frame detachably fixed to the vehicle, guard members consisting of separated brushes provided at the inner side, the outer side and the rear of the wheel for retaining the mud thrown up, said brushes being composed of single brush elements formed by metal clips in which the bristles are clamped, a member hinged to said frame to which member the brush elements are exchangeably secured and a second guard member provided on said frame for cleaning the tyre.

6. A mudguard for wheels of vehicles, having in combination, guard members consisting of brushes provided separately at the inner side, the outer side and the rear of the wheel for retaining the mud thrown up, said brushes being composed of single brush elements, a frame detachably fixed to a supporting part, a member hinged to said frame to which member the brush elements are exchangeably secured, means to adjustably and detachably connect said supporting part to a vehicle, and a second guard member provided on said frame for cleaning the tyre.

7. A mudguard for wheels of vehicles, having in combination, guard members consisting of brushes provided separately at the inner side, the outer side and the rear of the wheel for retaining the mud thrown up, said brushes being composed of single brush elements, a frame, a member hinged to said frame to which member the brush elements are exchangeably secured, a supporting member rigidly fixed to the vehicle, an intermediate supporting member detachably fixed to said supporting member, means detachably secured to said frame and linked by double links to said intermediate supporting member, a right and left hand threaded tightening screw diagonally arranged between two pivots of said link connection and cooperating with threaded portions fixed to said pivots for adjusting the brushes in the vertical direction, and a second guard member provided on said frame in a substantially horizontal operative position for cleaning the tyre.

In testimony that we claim the foregoing as our invention, we have signed our names.

ALBERT GERMANN.
ERNST LANG.